(12) United States Patent
West et al.

(10) Patent No.: US 6,175,833 B1
(45) Date of Patent: Jan. 16, 2001

(54) SYSTEM AND METHOD FOR INTERACTIVE LIVE ONLINE VOTING WITH TALLIES FOR UPDATING VOTING RESULTS

(75) Inventors: Brenden West, Seattle; Sean Anderson, Kirkland, both of WA (US)

(73) Assignee: Microsoft Corporation, Redmond, WA (US)

( * ) Notice: Under 35 U.S.C. 154(b), the term of this patent shall be extended for 0 days.

(21) Appl. No.: 09/064,567

(22) Filed: Apr. 22, 1998

(51) Int. Cl.[7] .................................................. G06F 17/30
(52) U.S. Cl. ..................... 707/102; 707/505; 707/506; 705/26; 434/323
(58) Field of Search ............................ 707/102, 505, 707/506, 507, 508; 705/10, 26; 434/323

(56) References Cited

U.S. PATENT DOCUMENTS

| | | | |
|---|---|---|---|
| 5,180,309 | * | 1/1993 | Egnor .................................... 434/323 |
| 5,893,098 | * | 4/1999 | Peters et al. ............................ 707/10 |
| 5,950,172 | * | 9/1999 | Klingman ................................ 705/26 |
| 5,950,213 | * | 9/1999 | Iida et al. ............................... 707/505 |

OTHER PUBLICATIONS

MSNBC Website ("Live Vote", http:www.msnbc.com/news/308310.asp), Oct. 28, 1999, pp 1–2).*

* cited by examiner

*Primary Examiner*—Thomas G. Black
*Assistant Examiner*—William Trinh (74) *Attorney, Agent, or Firm*—Lee & Hayes, PLLC (57) ABSTRACT

An online voting system provides a standardized database architecture that integrates editorial and production processes. The voting system has a survey database to store multiple surveys and a server to serve the surveys over a network (e.g., the Internet) to readers. Each survey consists of one or more questions and multiple answer options per question. The voting system includes an authoring tool to permit an editor to construct the surveys. The surveys are stored in a predefined survey index tables. A display handler checks reader requests for pages that contain surveys, to determine whether the reader should receive a voting form or survey results. A vote handler processes votes cast by the readers in response to the surveys. Unique identifiers of voters who respond to the surveys are collected in a votes table. This table is checked when each vote is received to prevent readers from voting multiple times for a single survey. The vote handler tallies the votes cast for the answer options in a totals table. The survey index table also has fields to hold voting results for corresponding survey questions and answer options. The vote handler periodically updates these fields with the totals kept in the totals table. This update is automatic without intervention from the editors. The same index table holds the information to present the survey questions (to first time readers) and to show the results to the survey (to readers who have cast a vote). Over time, the editor may remove one or more questions or the entire survey from the survey index table. The surveys are archived, along with all of the voting data from the three tables, in persistent storage. After archival, the voting data for the removed surveys is automatically deleted from all three tables.

30 Claims, 6 Drawing Sheets

Fig. 1

Survey Index Table

| Survey ID | Question # | Question Text | Option # | Option Text | Total Votes | Percentage |
|---|---|---|---|---|---|---|
| 1234 | 0 | | X | | 6,087 | 100% |
| 1234 | 1 | Do you think the Chicago Bulls will win the NBA Title? | 1 | Yes | 4,352 | 71.5% |
| 1234 | 1 | Do you think the Chicago Bulls will win the NBA Title? | 2 | No | 1,735 | 28.5% |

Editorial Type Fields | Results Type Fields

Fig. 2

Votes Table — 42

| Survey ID | GUID | Vote Date Time Stamp | Question # | Selected Option |
|---|---|---|---|---|
| 1234 | 7034512 | 4/30/98 13:08:34 | 1 | 1 |
| 5678 | 8004500 | 4/30/98 13:11:54 | 3 | 2 |

*Fig. 3*

Totals Table — 44

| Survey ID | Question # | Option # | Totals |
|---|---|---|---|
| 1234 | 1 | 1 | 4,352 |
| 1234 | 1 | 2 | 1,735 |

SYSTEM AND METHOD FOR INTERACTIVE LIVE ONLINE VOTING WITH TALLIES FOR UPDATING VOTING RESULTS

TECHNICAL FIELD

This invention relates to online voting systems. More particularly, this invention relates to a database system that tracks votes cast by voters online over a network such as the Internet in response to interactive polls, and returns poll results to the voters.

BACKGROUND OF THE INVENTION

The Internet provides a wonderful forum for mass distribution of news and other current information. Increasingly, more and more people are using the World Wide Web (or simply "WWW" or "Web") as their primary, or secondary, source of news and current events. Web sites from MSNBC, CNN, ESPN, and ABC News are experiencing rapidly increasing viewership.

One reason for the growing popularity is that the online forum offers the user an interactive experience, something that conventional television and newspapers cannot. Users can go directly to stories that interest them most. Content editors can also take advantage of the interactive environment by encouraging users to engage in further dialog or react in some manner to the content. For example, the MSNBC Web site found at www.msnbe.com offers readers the opportunity rate stories on an individual basis. The site then tallies the results and compiles a "Top 10" list of the most enjoyed stories.

Another opportunity for online content providers is to conduct live voting polls. Online providers insert survey questions as part of their content and invite readers to respond to the survey by submitting online votes. The impromptu polls typically coincide with current topics of interest featured in the story running beside the poll. As an example, a sports-related Web site, such as the ESPN site www.espn.sportzone.com might run an article on Michael Jordan. The content editors might ask the following question in conjunction with the story:

Do you think Michael Jordan will return to Chicago for another season?
Yes
No

Readers respond by clicking one of the two options. This action sends a response from the user's computer to the Web server at the site. The Web server adds the votes to other votes and compiles the results. The Web server downloads the results to the reader during a subsequent interaction with the user's computer. The poll results are posted as part of the story for the reader to observe how other people voted in comparison to his/her own vote. These real-time polls are very popular.

One problem with live online surveys concerns the underlying production framework for creating real-tine interactive polls. Production of online surveys requires a substantial amount of programming and quality-assurance testing. Typically, an editorial staff writes one or more survey questions in any manner they choose, and to derive what ever kind of response they desire. The questions may be drafted as multiple choice, open ended, essay, and so forth.

After the questions are written, a production group writes a dedicated software program and constructs a special database infrastructure to support the automated survey. For instance, the production group might create one or more database structures to hold votes cast by the readers and to relate those votes to the particular question(s). To support the MSNBC "Top 10" survey, for example, the MSNBC producers defined a table with fields to hold a story ID, a voter ID, a date that the vote is cast, and a response. The producers also defined a second table with fields for the story ID and vote totals. When a reader voted on a particular story, the vote was recorded in the first table in correlation with that story and the totals for that story were adjusted accordingly in the second table. These totals were then used to construct the "Top 10" list, which was presented back to the user.

Unfortunately, the program and data structures are usually built from scratch for each set of questions. The program and data structures are not portable from one survey to another. Moreover, since the database structures are rebuilt for each survey, the production group must test the entire polling process in an offline environment each time a new survey is produced. These tests ensure that the votes are collected properly, stored in the correct data locations, and tallied correctly, and that the results are returned in the desired format to the reader's computer. If the tests prove successful, the production group releases the content and survey for live presentation on the Web site. This testing process takes time, thereby increasing production costs for online content providers.

Accordingly, there is a need for a uniform approach that integrates the editorial process with the production process to standardize and streamline creation of online surveys.

SUMMARY OF THE INVENTION

An online voting system for facilitating live interactive online voting provides a standardized database architecture that integrates the editorial and production processes. The voting system has a survey database to store multiple surveys and a server to serve the surveys over a network (e.g., the Internet) to readers. Each survey consists of one or more questions and multiple answer options per question. For instance, the survey might consist of the survey question "Do you think the Chicago Bulls will win the NBA title?" and the two answer options "yes" and "no".

The voting system includes an authoring tool to permit an editor to construct the surveys. The surveys are stored in a predefined database structure, referred to as the "survey index table". The survey index table includes fields to hold the survey identifier, question number, the question text as drafted by the editor (e.g., "Do you think the Chicago Bulls will win the NBA title?"), and option text as drafted by the editor (e.g., "yes" and "no"). The survey index table is replicated onto a live site periodically, allowing editors time to preview their surveys, and served by the site server to interested readers over the network.

The online voting system has a vote handler to process votes cast by the readers in response to the surveys. Unique identifiers of voters who respond to the surveys are collected in a second database structure, known as the "votes table". The votes table has fields to hold survey IDs, the voters' unique identifiers, and time stamps indicating when the voters cast their votes. This table is checked when each vote is received to prevent readers from voting multiple times for a single survey question.

The vote handler tallies the votes cast for the answer options in a third database structure referred to as the "totals table". The totals table has fields to hold the survey IDs, the question numbers, the answer options for the questions, and the total votes cast per answer option.

The survey index table also has fields to hold voting results for corresponding survey questions and answer options. The vote handler periodically updates these fields with the totals kept in the totals table. This update is automatic without intervention from the editors.

In this manner, the same index table holds the information to present the survey questions and to show the results to the survey. The online voting system presents the survey form to first time readers. However, once the reader has cast a vote, the online voting system returns the survey with the voting tallies (but without an opportunity to vote again) so the reader can view the survey results.

Over time, as the survey becomes stale, the editor may remove one or more questions or the entire survey from the survey index table. The removed surveys are automatically archived, along with their vote totals and percentages, in persistent storage. After archival, the voting data for the removed surveys is automatically deleted from the votes and totals tables.

DETAILED DESCRIPTION

Figure 1:
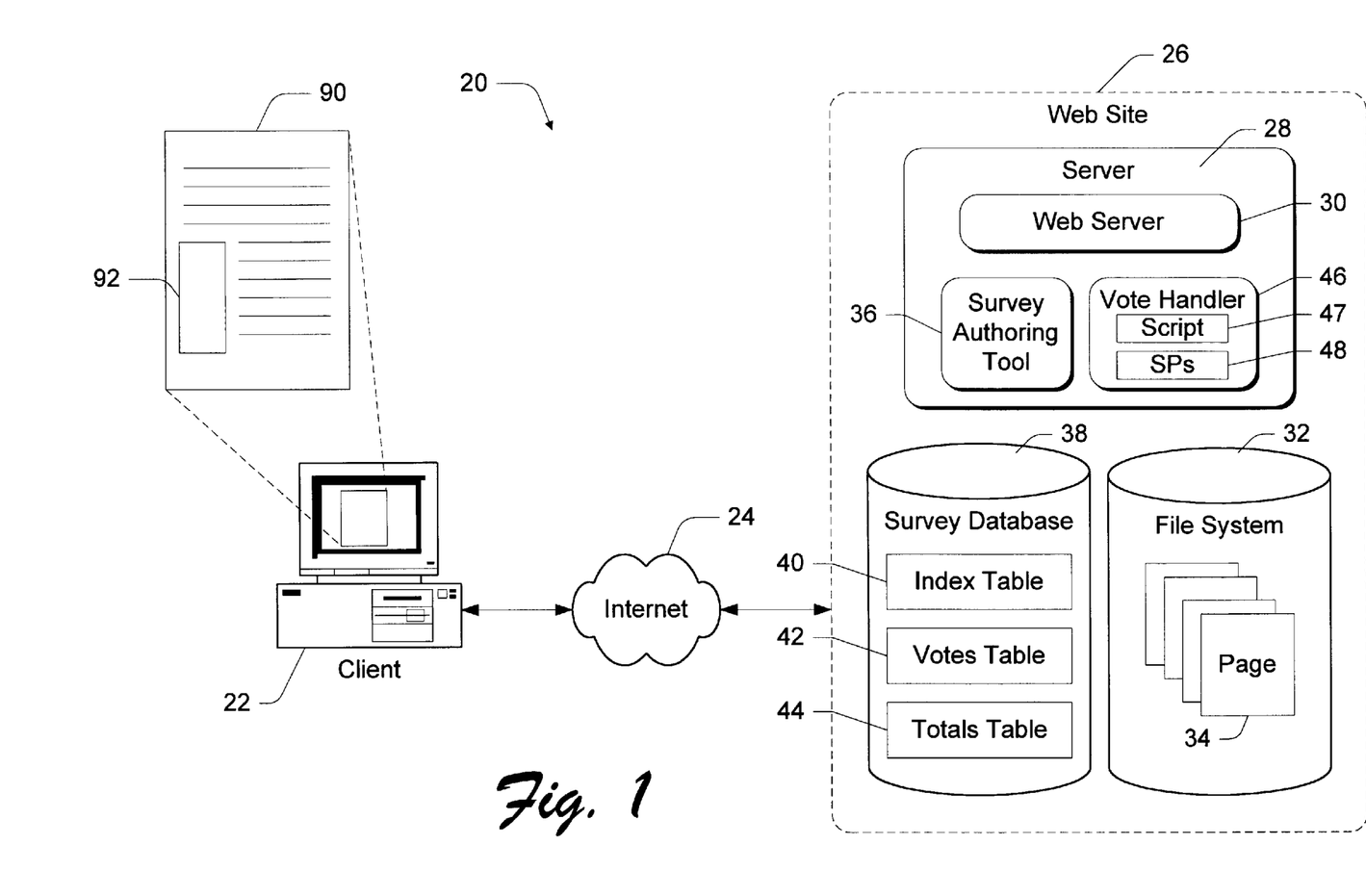
FIG. 1 is a diagrammatic illustration of a simple computer network system having a client and a Web site.

A computer network system, particularly one on the scale of the Internet, has many host network servers connected to serve data to many clients over a network. FIG. 1 shows a simple computer network system 20 representative of the familiar, large-scale Internet environment. The system 20 has a client computer 22 resident at a user's premises. Although illustrated as a desktop PC, the client computer 22 is representative of many different types of computing devices, including portable computers, hand held computers, pagers, Web-phones, set-top boxes for TVs, and so forth.

The client computer 22 connects to the Internet 24 via a modem, network card, or other type of interface. The client computer 22 runs a Web browser application (not shown) to access content provided on the World Wide Web. The Web content is maintained at a variety of Web sites, as represented by Web site 26.

The Web site 26 has one or more server computers, collectively referred to as server 28. The server computers may be implemented in various ways, including Unix-based sever computers or PC-based computers that run the Microsoft Windows NT Server operating system. The server 28 runs a Web server software program 30 that accepts requests from the client-based Web browser, accesses a file system 32 containing pre-stored content in the form of Web pages 34, and returns the requested page(s) to the client 22.

The Web pages are commonly written in HTML (hypertext markup language) and XML (extensible markup language). Additionally, the Web pages 34 may be written as active server pages, or ".asp" text files, using the active server page technology from Microsoft Corporation. An active server page allows a user to write Web pages using a combination of a hypertext language (e.g., HTML) and a scripting language, such as Visual Basic from Microsoft Corporation or Java™ from Sun Microsystems. Active server pages are described in documentation available from Microsoft's Web site "www.microsoft.com", currently under the section Internet Information Services.

The Web pages 34 are transmitted using conventional network protocols, such as TCP/IP (Transmission Control Protocol/Internet Protocol), HTTP (Hypertext Transfer Protocol) and DCOM (Distributed Component Object Model). The client-based browser, or other application, renders the Web page into human-perceptible forms. The Web page might include text, images, sound, video, active code, and so forth.

Of particular interest in this system 20 is a technique for conducting live online votes. In this illustration, the server 28 is shown running a software-based survey authoring tool 36 that allows an editor to construct online surveys. It is noted that the authoring tool may be alternatively (and preferably in some cases) run on a separate editor's computer, with the survey information being written into the database. In one implementation, the authoring tool 36 is an application program written in Visual Basic that facilitates entry of one or more questions, and the multiple choice answers that may be selected in response to the questions.

To illustrate the context, consider the following scenario, which will be relied upon throughout this discussion. Suppose the Web site 26 contains content on current events, such as news, sports, weather, stocks, etc. With the time of year nearing the completion of the NBA regular season, attention is focused once again on which team will capture the coveted NBA crown as world champions. The obvious dilemma, at least in 1998, is whether the Chicago Bulls can win it all again. The editorial staff at the Web site 26 is also intrigued by this issue and decides to post a survey to see if the readership expects the Bulls to repeat as NBA champions. The editorial staff constructs the following question:

Do you think the Chicago Bulls will win the NBA title?
Yes
No

The authoring tool 36 enables the editor to enter the text of the question, to number the question, and to enter the "yes" and "no" responses. The information entered by the editor is stored in a survey database 38. The survey database 38 is preferably implemented using structured query language (SQL) technology, such as the SQL Server product from Microsoft.

The survey database 38 has three database structures or tables: a survey index table 40, a votes table 42, and a totals table 44. The questions drafted by the editor are stored as entries in the survey index table 40. That is, according to an aspect of this invention, the questions drafted by the editor are conformed to a predefined, standardized table structure that can be reused over and over for different surveys. Moreover, the survey index table 40 holds questions for many different surveys, thereby eliminating the cost and hassles of building a new and separate database infrastructure for every new survey. The authoring tool 36 effectively operates as a front end for adding an entry to the common survey index table 40.

Figure 2:
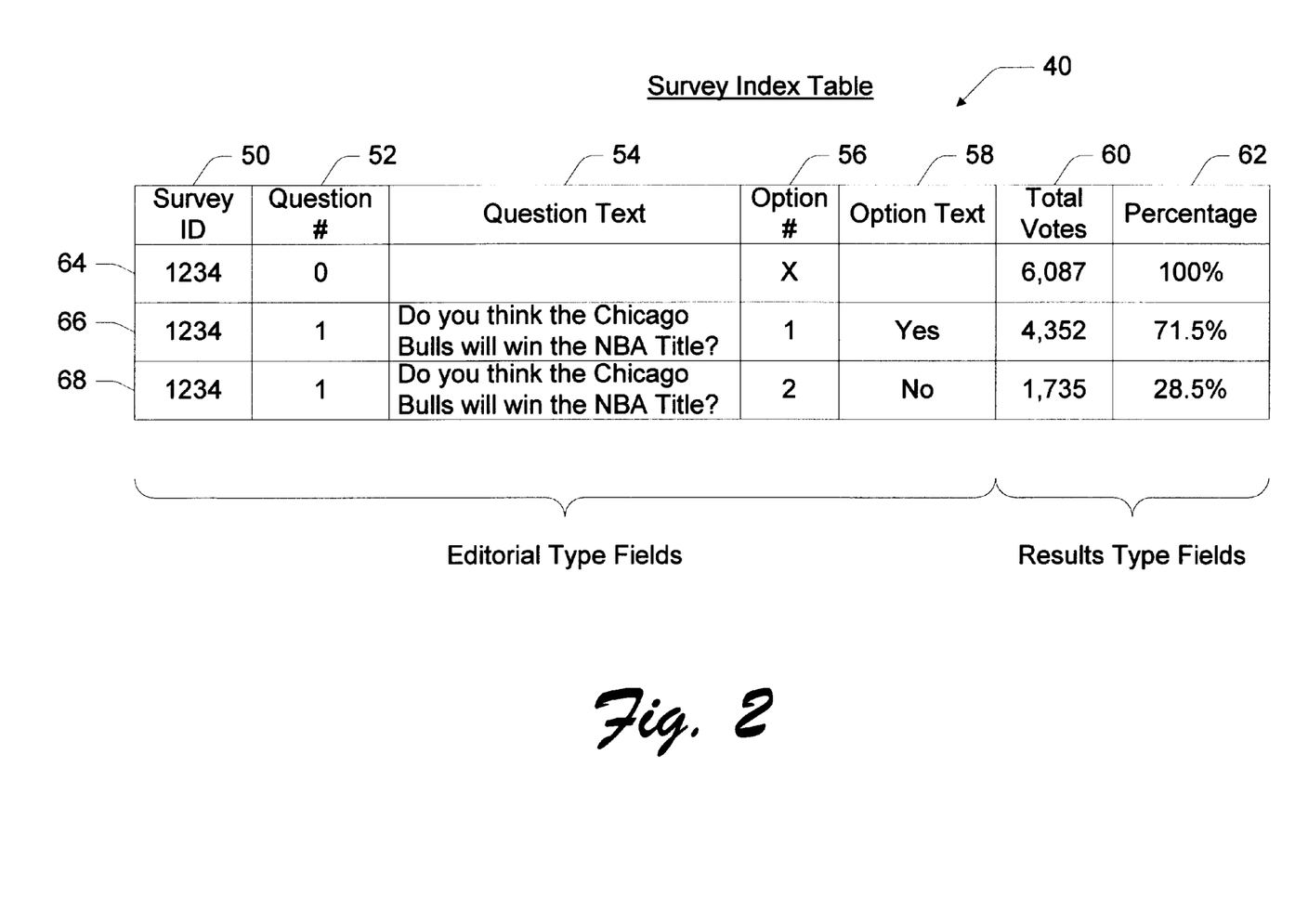
FIG. 2 is a diagrammatic illustration of a survey index table maintained as a database data structure at the Web site.

FIG. 3 shows the survey index table 40 in more detail. For any given survey question, the survey index table 40 holds all of the information used to present the question and to display the results of the question. The survey index table 40 contains a survey ID field 50 to hold a unique identifier for the survey and a question number field 52 to list the number of one or more questions contained within the survey. The survey index table 40 also has a question text field 54 to hold the question drafted by the editor, an option number field 56 to identify the multiple-choice options for answering the question, and an option text field 58 to hold the option language written by the editor. The survey index table 40 further includes a total votes field 60 to hold the voting totals for corresponding questions and answer options and a percentage field 62 to hold the voting totals as a percentage.

Some of the fields are filled in automatically, while other fields contain data entered by the editor. The survey ID field 50 contains a number or other unique identifier that is chosen by the editor for each new survey. The ID may simply be the unique identifier (URL) of the story in which the survey will be displayed, or a 'slug' (e.g. 'spt_0205_jordanretire') that allows editors to quickly identify the survey. The question number field 52, question text field 54, option number field 56, and option text field 58 are all filled in by the editor, via the authoring tool 36. The last two fields 60 and 62 are filled in automatically by stored procedures in the survey database 38 (discussed below in more detail).

The fields in the survey index table 40 can be segregated into two types: an editorial type, which is filled in during the editorial phase, and a results type, which is filled in automatically while the survey is in operation on the live Web site.

Each question consumes multiple rows in the table. There is an initial row 64 that marks the beginning of the question. This row 64 is associated with the question via the survey ID and holds the voting totals and percentage for the entire question. In this example, the total "6,087" in the first row 64 of the total votes column 60 is the sum of the votes for each option below.

There is a row for each answer option of the question. In this example, the question has two options and thus the table entry includes two rows 66 and 68, one for each option. The middle row 66 contains the text of the "yes" option in field 58, and the voting results for that option in the total votes field 60 and percentage field 62. The last row 68 contains the text of the "no" option in field 58 and the voting results for that option.

With reference again to FIG. 1, the survey database 38 also maintains the votes table 42 and the totals table 44. These tables are used to track voters who cast votes in the online survey and to store tallies of the votes.

Figure 3:
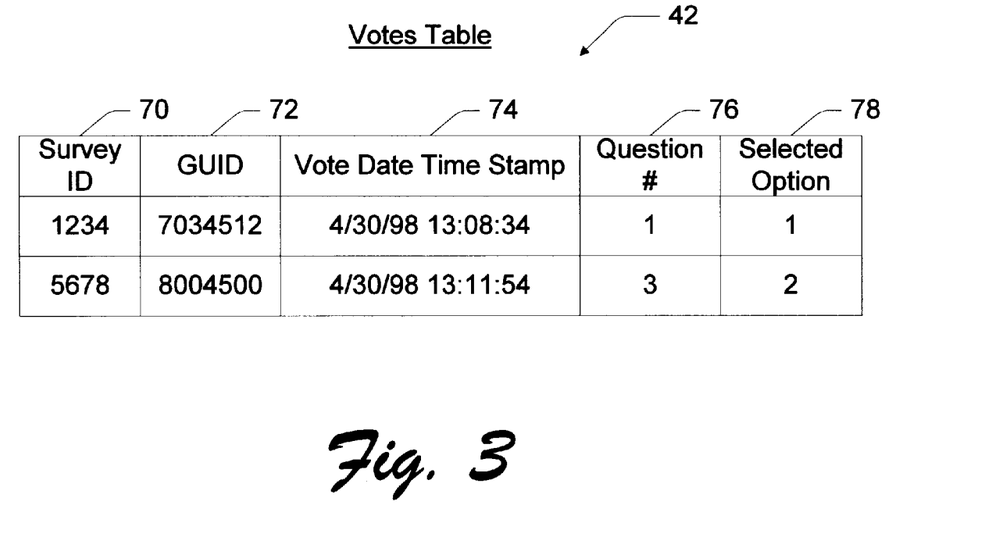
FIG. 3 is a diagrammatic illustration of a votes table maintained as a database data structure at the Web site.

FIG. 3 shows the votes table 42 in more detail. The votes table 42 tracks which readers have cast votes in the current survey. The votes table 42 contains a survey ID field 70 to hold the unique identifier assigned to the survey. The votes table also contains a GUID field 72 to hold a global unique identifier (GUID) of the browser software that submitted the vote. The Web server assigns this identifier when the browser first requests a page from the Web site. The GUID remains associated with that browser from that point on. The votes table 42 has a vote date time stamp field 74 to hold the date and time that the vote was cast by the browser. The votes table 42 also has a question number field 76 and a selected option field 78 to hold the number of the option selected by the reader.

Figure 4:
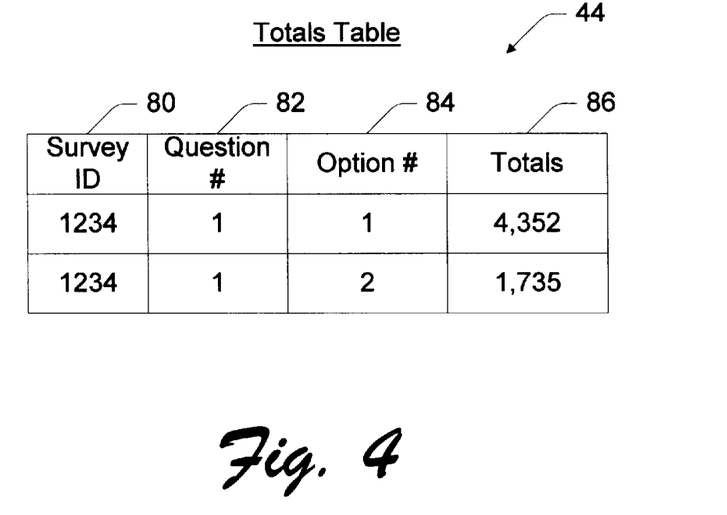
FIG. 4 is a diagrammatic illustration of a totals table maintained as a database data structure at the Web site.

FIG. 4 shows the totals table 44 in more detail. The totals table 44 cumulates the total votes cast for each answer option for a give survey question. The totals table 44 contains a survey ID field 80 to hold the unique identifier assigned to the survey and a question number field 82 to hold the question number of the survey question (if any). The table 44 also has an option number field 84 to identify the multiple-choice options for answering the question and a totals field 86 to hold the voting totals for corresponding questions.

Notice that the survey ID serves to relate information from the same survey in the three different tables 40–44. A survey ID field is maintained in each table to allow cross-referencing among the tables. The three-table architecture is advantageous as it prevents read and write queries from blocking each other. Data can be simultaneously written into the votes table 42 and totals table 44 while results are being read from the survey index table. Background procedures continuously update the survey index table with the latest results from the totals table 44.

With reference again to FIG. 1, the server 28 runs a vote handler 46 that facilitates live online voting. In this implementation, the vote handler 46 is a collection of small programs written in scripting and database languages. The vote handler 46 includes a server-side voting script 47 and several stored procedures (SPs) 48 for manipulating data in the database tables 40–44. The stored procedures 48 are implemented, for example, as programs written in SQL (e.g., SQL Server from Microsoft). Although the vote handler is illustrated generally for convenience of discussion, in practice the programs are run on two separate application servers. Namely, the script 47 is run on the Web server and the stored procedures are run on a database server (e.g., SQL Server).

In this implementation, there are four stored procedures: a display procedure, a vote procedure, a tally procedure, and a flush procedure. The display script obtains the reader's GUID and the survey ID when a page containing this script is processed by the Web server. The display script passes this information to the display procedure in the survey database. The display procedure checks whether the reader has already voted in this survey. If the reader has voted before, the display procedure returns survey results for display to the reader. If not, the display procedure returns the survey information to present the reader with a voting form.

The voting script 47 receives the reader's vote, and passes the vote to the vote procedure. The voting script 47 also redirects the reader back to the content where he/she voted.

The vote procedure receives a reader vote and checks whether the reader has already voted in this survey. If not, the vote procedure writes the vote into the votes table 42, and updates the totals table 44. If the reader has voted before, the vote procedure returns survey results for display to the reader.

The tally procedure calculates totals and percentages of each question and option, for each survey, using the data from the totals table 44. The tally procedure writes the totals and percentages into the appropriate fields 60 and 62, respectively, of the survey index table 40. This procedure is executed periodically, such as once per minute.

The flush procedure removes votes and totals for surveys that have been removed from the survey index table 40. For instance, an editor may decide to delete a poll that has run it course. Any remaining data in the tables 40–44 that corresponds to the removed survey needs to be likewise removed. The flush procedure archives the totals and percentages for surveys that are being removed from the current index and then deletes the data from the tables. The flush procedure runs periodically and preferably on the same schedule as replication of the survey index table to the live Web site.

The editorial process and live online voting process will now be described in the context of the Chicago Bulls survey. The processes are described with reference to the flow diagrams in FIGS. 5 and 6, along with additional reference to the system of FIG. 1 and the tables of FIGS. 2–4.

For simplicity sake, suppose the Chicago Bulls survey consists of only one question. At step 100 in FIG. 5, the editor invokes the authoring tool 36 to draft the desired question. The editor enters the question number "1" and types in the text of the question (step 102 in FIG. 5). The editor may elect for presentation purposes to leave the number blank since there is only one question, which is acceptable to the system. At step 104 in FIG. 5, the editor types in the possible responses, which in this example are "yes" and "no". At step 106, the editor assigns a survey ID, say number "1234", to the Chicago Bulls survey. It is noted that these editor entry steps may be rearranged and are not limited to the specific order shown in FIG. 5. At this point, the editor completes data entry The authoring tool 36 creates a new entry for the survey index table 40 (step 108 in FIG. 5). At step 110, the survey ID, question number, and accompanying text are entered into respective fields 50, 52 and 54 of the table 40. Also, the possible answers are added to the option number field 56 and option text field 58, respectively.

Figure 5:
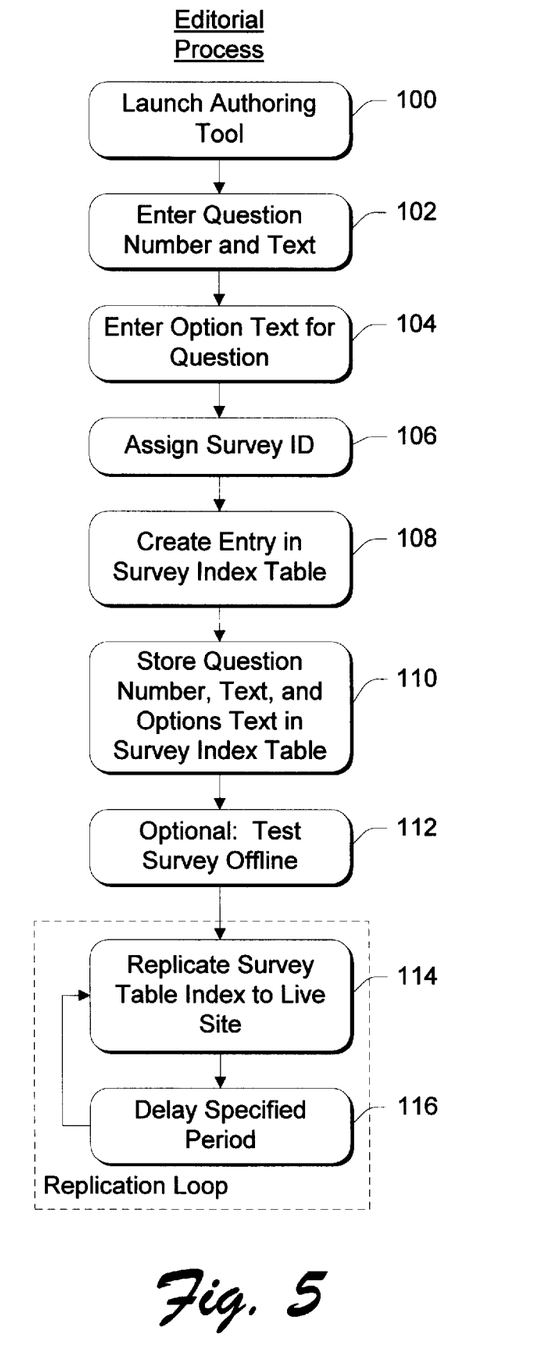
FIG. 5 is a flow diagram showing steps in an editorial process for creating an online survey.

The survey can be optionally tested offline (step 112 in FIG. 5). An advantage of this system is that the survey index table is standardized and used multiple times for different surveys. Accordingly, the Web site operator can develop an assurance that the structure will work each time, as new surveys are added. For simple surveys, the editor can be reasonably assured that the survey will work once posted to the survey database. However, the editor may still like to run an offline test just to check for presentation and typographical errors.

The survey index table 40 is replicated to the live site (step 114 in FIG. 5). The replication phase occurs periodically at predetermined intervals (step 116 in FIG. 5). For instance, the Web site operator may choose to replicate the survey index table 40 every fifteen minutes. This keeps the site current, and allows the editor to change the survey by adding or removing questions, add new surveys or remove old ones, and so forth, as the events change.

After the editorial process is complete, the live online voting process is ready for real-time operation. At step 150 in FIG. 6, the Web server 30 receives a request from the client 22. The Web server 30 determines initially whether it has received a request from this particular user, or more particularly, from this particular Web browser (step 152 in FIG. 6). If not (i.e., the "yes" branch from step 152, the Web server 30 assigns a unique GUID to the Web browser used to submit the request (step 154). Thereafter, and for each subsequent request from that Web browser, the Web server determines whether the request is for a particular page that has been requested before by that browser, or a new page for that browser (step 156 in FIG. 6).

In this first pass, assume that the user has requested the sports story discussing the upcoming NBA playoffs. The Web server 30 recognizes that this page has not been requested by this browser (i.e., the "no" branch from step 156), and retrieves the Web page 34 (i.e., the ASP file) containing the story from the file system 32 (step 158 in FIG.6).

The Web server 30 processes the ASP file to form a Web page that is passed to the user's computer 22. The ASP file contains the text for the story and an in-story voting control for facilitating presentation of the survey. The control is a combination HTML and server-side commands. When the Web page is loaded into the web server, the control queries the survey database 38 at the Web site 26 to determine whether the reader has voted on this particular survey. Depending on the reader's status, the control displays either a survey question or the survey results.

In one implementation, the control is contained in an include command inserted into the HTML file. An example of this command is as follows:

<% Lvname="somesurveyname" %><!--#include virtual="/modules/livevote/display.asp"-->

The "Lvname" feature allows the producer to present the same survey and results in multiple locations simultaneously.

Assuming the reader has not voted, the Web server retrieves the appropriate survey from the survey index table 40 in survey database 38 (step 160 in FIG. 6) and inserts it, without the poll results, into the Web page (step 162). The Web server downloads the Web page with survey in HTML format to the client computer (step 164 in FIG. 6). In this initial presentation, only the survey question and options are presented, and not the poll results. Thus, the totals and percentages in the respective fields 60 and 62 of the survey index table are not displayed in the HTML document that is ultimately rendered by the client-side browser.

The Web browser on the client computer renders the Web page, as represented by page 90 in FIG. 1. The rendered page has an area for the story and a poll/quote area 92 for the survey question. In the continuing example, the poll/quote area 92 lists the question as follows:

Do you think the Chicago Bulls will win the NBA title?
Yes
No

The reader decides to cast a vote in this survey by clicking on one of the two responses. This mouse action causes the browser to submit a vote request to the Web server 30. Again, with reference to FIG. 6, the Web server 30 receives the request (step 150). However, this time the request is for the same page and contains a vote. Hence, the process takes the "yes" branch from step 156. In implementation, the vote request is sent to the dedicated voting script, which passes the vote information to the survey database and redirects the client-side Web browser back to the originating page.

The vote request includes the reader's selection (i.e., option "yes" or option "no"), the reader's GUID, the URL (universal resource locator) of the content containing the survey, and the Lvname (if any). The Web server 30 transfers the information to the vote handler 37, which passes the information to a SQL stored procedure for processing.

The voting procedure of the vote handler 46 evaluates whether the GUID in the vote request is recorded in the votes table 42 in conjunction with the particular survey. If the same GUID for the same question is recorded in the votes table 42, the reader has voted before on this survey and the vote is ignored. This condition is discussed below.

Assuming this is the first time the reader has tried to vote on this question (i.e., the "yes" branch from step 168), the vote handler 46 adds the vote as a new entry to the votes table 42 to indicate that the person associated with the particular GUID has now voted (step 170). Additionally, the votes table 42 reflects which answer options the person has selected in his/her vote For example, in FIG. 3, the vote handler 46 creates an entry indicating that a person associated with the GUID "7034512" responded to the survey with an ID "1234" at approximately 1:08 PM on Apr. 30, 1998, and that this person voted for answer option 1 in question 1. This information reflects that the person voted "yes" to question 1 of the Chicago Bulls survey.

The tally procedure of the vote handler 46 adjusts the voting totals for the survey question in the totals table 44

Figure 6:
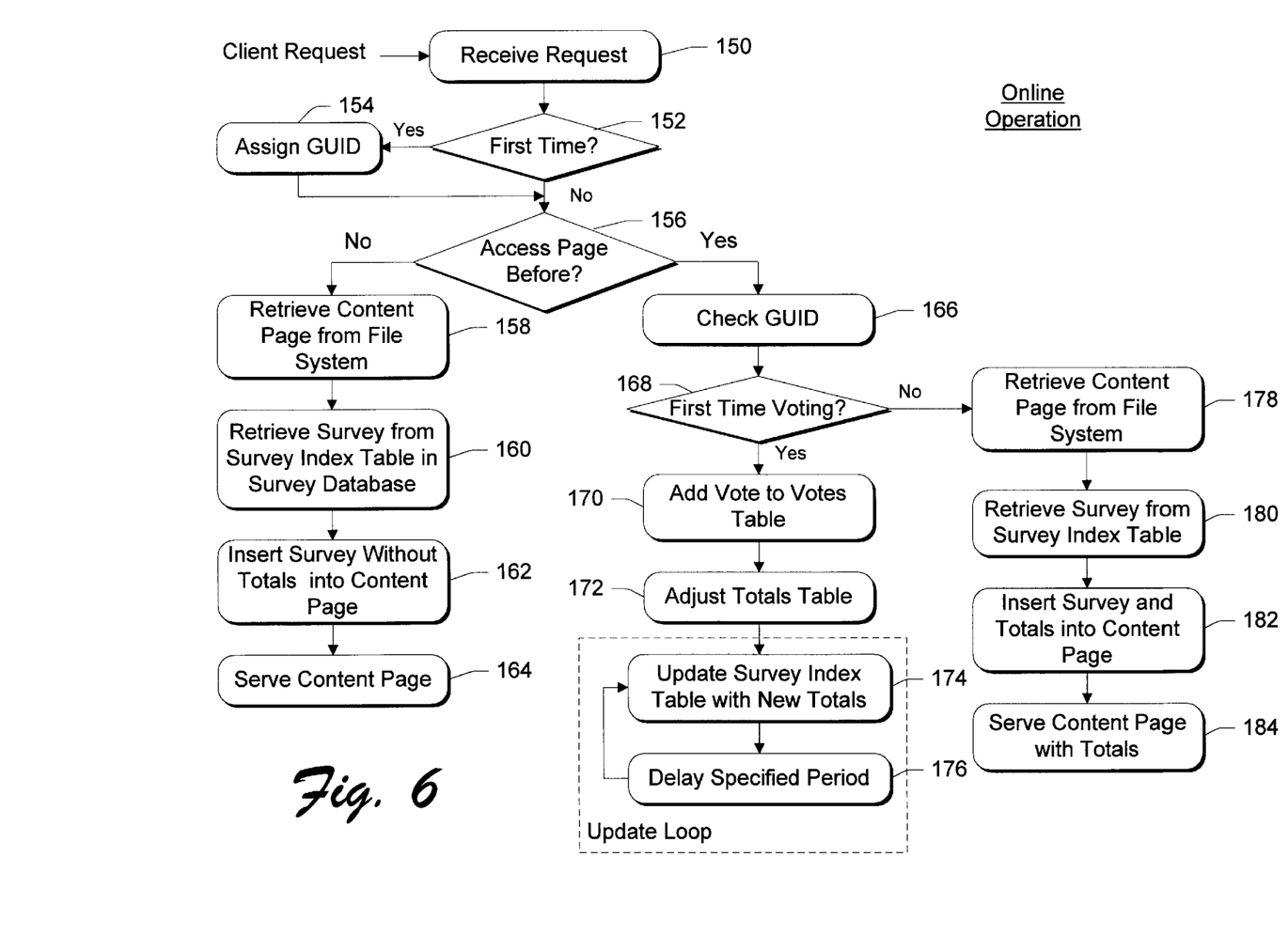
FIG. 6 is a flow diagram showing steps in an online voting process.

(step 172 in FIG. 6). In FIG. 4, a vote for the "yes" option 1 results in incrementing the value 4,352 by one vote. Alternatively, a vote for the "no" option 2 results in incrementing the value 1,735 by one vote.

The survey index 40 table is updated periodically by the tally procedure with the most recent vote tallies (steps 174 and 176 in FIG. 6). As an example, the vote handler 46 updates the survey index table 40 every minute. More specifically, for a given question, the vote handler extracts the totals for all answer options from the totals field 86 in the totals table 44 and sums them together. The vote handler than computes corresponding percentages reflecting the percentage of readers answering "yes" and the percentage of readers answering "no". The vote handler inserts the new totals and percentages into the total votes field 60 and percentage field 62, respectively, of the survey index table 40. Accordingly, these results type fields are automatically updated in periodic fashion (e.g., once per minute).

Now, suppose the reader returns to the page with the survey. In response to the user's action, the Web browser submits a request for the page to the Web server 30. The Web server 30 receives the request (step 150). Since this request is not the first one for this page (i.e., the "yes" branch from step 156) and since the user has already voted for the survey (i.e., the "no" branch from step 168), the Web server 30 retrieves the Web page 34 (i.e., the ASP file) containing the story from the file system 32 (step 178 in FIG.6). The Web server 30 processes the ASP file to form the ultimate Web page presented to the reader.

This time the "include" command indicates that the survey results are to be included with the survey. The Web server retrieves the appropriate survey from the survey index table 40 (step 180 in FIG. 6) and inserts it, along with the totals and percentages, into the Web page (step 182). The Web server downloads the Web page with survey in HTML format to the client computer (step 184 in FIG. 6).

This time, when the Web browser on the client computer renders the Web page, the survey question in the poll/quote area 92 looks as follows:

Do you think the Chicago Bulls will win the NBA title?
    Yes (71.5%)
    No (28.5%)
    Total votes: 6,087

The method prevents users from voting twice. If the user attempts to vote again, the vote handler 46 will recognize that the GUID for that question is already recorded in the votes table. As a result, the process is returned to step 178 for construction of the survey with results included.

Figure 7:
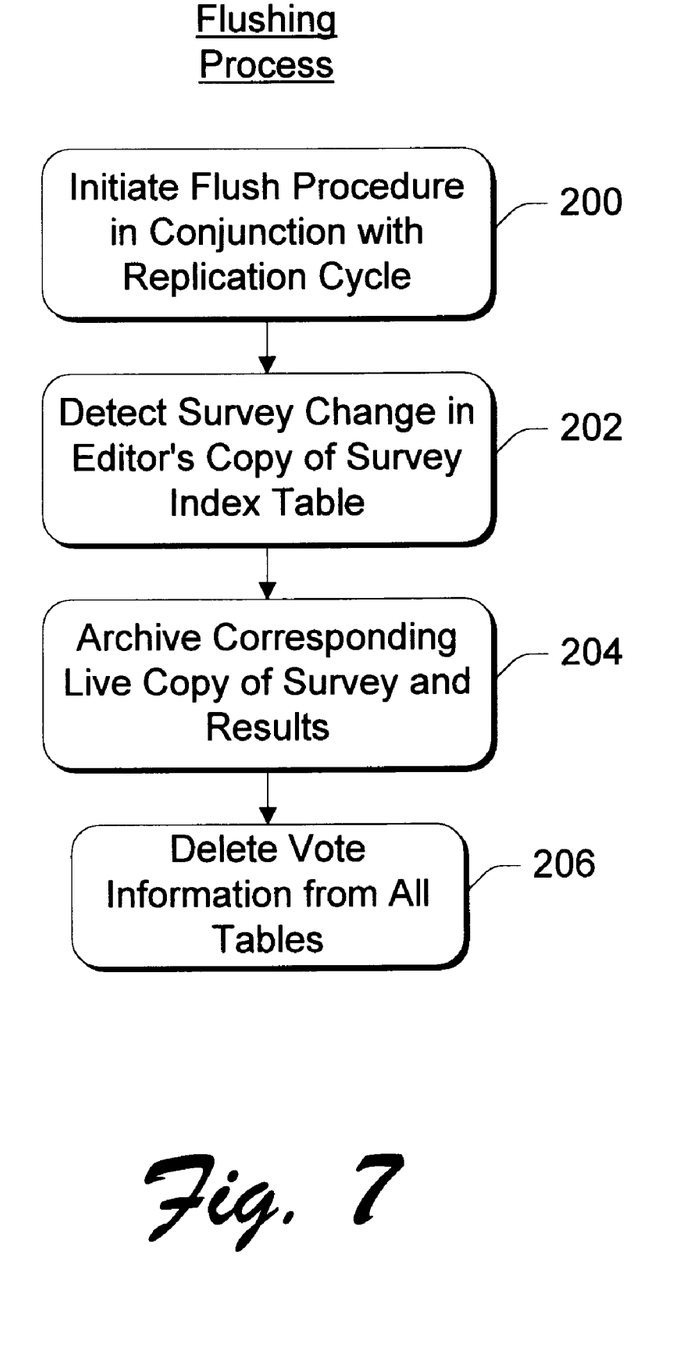
FIG. 7 is a flow diagram showing steps in flushing process for archiving old surveys.

FIG. 7 shows the steps in the survey flushing procedure. The flush procedure of the vote handler 46 wakes up periodically (step 200). Preferably, the flush procedure is initiated every replication cycle when the editor's offline copy of the table is replicated to the live site. At step 202 in FIG. 7, the flush procedure detects any change in the editor's copy of the survey index table. Over time, as the poll becomes stale, the editor may delete one or more questions or the entire survey from the survey index table 40. The corresponding totals and percentages in fields 60 and 62 remain, however, because the editor does not have access to these fields. Likewise, the data for the deleted question(s)/survey(s) in the votes and totals tables 42 and 44 remains.

The flush procedure of the vote handler 46 archives a copy of the deleted question(s)/survey(s), along with the totals and percentages contained in the online index table, in persistent storage (step 204 in FIG. 7). After archival, the flush procedure deletes the voting data from all three tables (step 206 in FIG. 7).

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. An online voting system for facilitating live interactive online voting, comprising:

a survey database to store one or more surveys, each survey having at least one question and answer options to the question;

a server to serve the surveys over a network to users;

a vote handler to process votes cast by the users in response to the surveys;

a survey index table maintained in the survey database to hold the surveys, the survey index table correlating the survey questions, the answer options to the survey questions, and the voting results of the survey questions;

a votes table maintained in the survey database to track which users have cast the votes and which options each voter has selected;

a totals table maintained in the survey database to hold tallies of the votes in correspondence with ones of the answer options of the survey questions, the tallies being used to update the voting results in the survey index table; and wherein the survey index table is used by the server to either (1) present the survey questions and corresponding answer options to the users, or (2) display the voting results in conjunction with the survey questions.

2. An online voting system as recited in claim 1, wherein the survey index table holds multiple different surveys.

3. An online voting system as recited in claim 1, wherein the survey index table has editorial fields to hold the surveys constructed by an editor and result fields to hold the voting results, the result fields being automatically updated from the tallies held in the totals table without intervention from the editor.

4. An online voting system as recited in claim 1, wherein the survey index table comprises:

a survey ID field to hold unique identifiers for the surveys;

a question number field to list numbers of the survey questions;

a question text field to hold text of the survey question as drafted by an editor;

an option number field to identify the answer options for answering the survey questions;

an option text field to hold text of the answer options as drafted by the editor; and a voting results field to hold the voting results.

5. An online voting system as recited in claim 4, wherein the voting results field comprises:

a totals field to hold total votes cast for corresponding ones of the survey questions and the answer options; and a percentage field to hold the percentage of votes cast for corresponding ones of the answer options.

6. An online voting system as recited in claim 1, wherein the totals table comprises:

a survey ID field to hold unique identifiers for the surveys;

a question number field to list numbers of the survey questions;

an option number field to identify the answer options for answering the survey questions; and a totals field to hold total votes cast for corresponding ones of the answer options.

7. An online voting system as recited in claim 1 and further comprising an authoring tool to permit an editor to construct the surveys that are stored in the survey index table.

8. An online voting system comprising:

survey database to store one or more surveys, each survey having at least one question and answer options to the question;

a server to serve the surveys over a network to users;

a vote handler to process votes cast by the users in response to the surveys;

a survey index table maintained in the survey database to hold the surveys, the survey index table correlating the survey questions, the answer options to the survey questions, and the voting results of the survey questions;

a votes table maintained in the survey database to track which users have cast the votes and which options each voter has selected;

a totals table maintained in the survey database to hold tallies of the votes in correspondence with ones of the answer options of the survey questions, the tallies being used to update the voting results in the survey index table;

wherein the survey index table is used by the server to either (1) present the survey questions and corresponding answer options to the users, or (2) display the voting results in conjunction with the survey questions; and a flushing process to archive the surveys automatically to persistent storage after an editor removes the surveys from online distribution.

9. An online voting system for facilitating live interactive online voting, comprising:

a survey database to store one or more surveys, each survey having at least one question and answer options to the question;

a server to serve the surveys over a network to users;

a vote handler to process votes cast by the users in response to the surveys;

a survey index table maintained in the survey database to hold the surveys, the survey index table correlating the survey questions, the answer options to the survey questions, and the voting results of the survey questions;

a votes table maintained in the survey database to track which users have cast the votes and which options each voter has selected, the votes table comprising:

(a) a survey ID field to hold unique identifiers for the surveys;

(b) voter ID field to hold unique identifiers for the users who cast votes;

(c) a time stamp field to hold times when corresponding users cast their respective votes;

(d) a question number field to hold numbers of the survey questions voted on by the users; and (e) a selected option field to hold the answer options selected by the users for corresponding survey questions;

a totals table maintained in the survey database to hold tallies of the votes in correspondence with ones of the answer options of the survey questions, the tallies being used to update the voting results in the survey index table; and wherein the survey index table is used by the server to either (1) present the survey questions and corresponding answer options to the users, or (2) display the voting results in conjunction with the survey questions.

10. A standardized database structure stored in a computer-readable medium for facilitating interactive online voting, comprising:

editorial fields to hold content entered by an editor to construct a survey, the editorial fields holding written text of the survey and possible answer options as drafted by the editor;

at least one result field to hold voting results for the survey; and wherein the database structure can be used to (1) present the survey to a reader without the voting results if the reader has not previously answered the survey, and (2) show the voting results if the reader has previously answered the survey.

11. A standardized data structure as recited in claim 10, wherein the editorial and result fields hold multiple surveys and correlate the multiple surveys with corresponding voting results.

12. A Web site that supports interactive online voting, comprising:

a Web server to serve the online survey and to receive votes to the survey;

a database to store the survey and the votes thereto; and a standardized database structure as recited in claim 10 stored in the database.

13. A standardized database structure stored in a computer-readable medium for facilitating interactive online voting, comprising:

a survey ID field to hold unique identifiers for one or more surveys;

a question number field to list numbers of questions in the surveys;

a question text field to bold text of the survey questions as drafted by an editor;

an option field to identify answer options for answering the survey questions;

an option text field to bold text of the answer options as drafted by the editor; and a voting results field to hold voting results derived from multiple readers.

14. A standardized database structure as recited in claim 13, wherein the voting results field comprises:

a totals field to hold total votes cast for corresponding ones of the survey questions and the answer options; and a percentage field to hold the percentage of votes cast for corresponding ones of the answer options.

15. A standardized database structure as recited in claim 13, wherein the question number field, question text field, option field, and option text field store data entered by the editor, and the voting results field store the voting results automatically without intervention from the editor.

16. A Web site that supports interactive online voting, comprising:

a Web server to serve the online survey and to receive votes to the survey;

a database to store the survey and the votes thereto; and a standardized database structure as recited in claim 13 stored in the database.

17. A standardized database architecture for facilitating live online voting, the database architecture being embodied as multiple database table structures stored in a computer-readable medium, comprising:

a survey index table to hold one or more surveys, the survey index table correlating survey questions, answer options to the survey questions, and voting results of the survey questions;

a votes table to track which voters have cast votes in response to the surveys and which options each voter has selected; and a totals table to hold tallies of the votes in correspondence with particular ones of the answer options of the survey questions, the tallies being used to update the voting results kept in the survey index table.

18. A standardized database architecture as recited in claim 17, wherein the survey index table can be read concurrently while the votes table or the totals table is being written.

19. A standardized database architecture as recited in claim 17, wherein the survey index table comprises:

a survey ID field to hold unique identifiers for the surveys;

a question number field to list numbers of the survey questions;

a question text field to hold text of the survey question as drafted by an editor;

an option field to identify the answer options for answering the survey questions;

an option text field to hold text of the answer options as drafted by the editor; and a voting results field to hold the voting results.

20. A standardized database architecture as recited in claim 19, wherein the voting results field comprises:

a totals field to hold total votes cast for corresponding ones of the survey questions and the answer options; and a percentage field to bold the percentage of votes cast for corresponding ones of the answer options.

21. A standardized database architecture as recited in claim 17, wherein the votes table comprises:

a survey ID field to hold unique identifiers for the surveys;

a voter ID field to hold unique identifiers for the users who cast votes;

a time stamp field to hold times when the users cast their respective votes;

a question number field to hold numbers of the survey questions voted on by the users; and a selected option field to hold the answer options selected by the users for corresponding survey questions.

22. A standardized database architecture as recited in claim 17, wherein the totals table comprises:

a survey ID field to hold unique identifiers for the surveys;

a question number field to list numbers of the survey questions;

an option field to identify the answer options for answering the survey questions; and a totals field to hold total votes cast for corresponding ones of the answer options.

23. A method for operating an interactive online vote in which a Web site provides surveys inviting readers to cast votes using their computers, the method comprising the following steps:

creating a survey having one or more questions, each question having answer options from which readers are to select when casting a vote;

storing the survey in a survey index table;

upon receipt of first time requests from readers, downloading the survey from the survey index table to the readers;

tallying the votes to the survey from the readers;

storing the voting results in the survey index table in correlation with the questions and answer options;

upon receipt of non-first time requests from the readers, downloading the voting results from the survey index table to the readers; and removing the survey from the survey index table.

24. A method as recited in claim 23, further comprising the following steps, prior to the removing step:

creating a second survey having one or more questions, each question having answer options from which readers are to select when casting a vote;

storing the second survey in the survey index table along with the first survey;

upon receipt of first time requests from readers, downloading the second survey from the survey index table to the readers;

receiving votes to the second survey from the readers;

tallying the votes to the second survey to derive voting results for the second survey; and storing the voting results for the second survey in the survey index table in correlation with the questions and answer options in the second survey.

25. A method as recited in claim 24, further comprising the following step:

automatically archiving the survey, along with the voting results.

26. A method for operating an interactive online voting system in which a Web site provides surveys inviting readers to cast votes using their computers, the voting system having a survey database to store one or more surveys with each survey having at least one question and multiple answer options to the question and a server to serve the surveys over a network to the readers, the method comprising the following steps:

storing survey questions and answer options for a survey in a survey index table;

receiving votes cast by the readers for individual answer options in response to the survey;

recording identifiers associated with the individual readers who cast votes along with the answer options selected by the readers in a votes table;

cumulating the vote totals for the individual answer options in a totals table;

tallying the vote totals for individual survey questions;

periodically recording the vote totals for the survey questions and the answer options in the survey index table;and removing the survey from the survey index table.

27. A method as recited in claim 26 further comprising the step of concurrently reading data from the survey index table while writing data to the votes table or the totals table.

28. A method as recited in claim 26 further comprising the following step:

automatically archiving the survey, along with the vote totals for the survey.

29. A data structure, stored in a computer-readable medium, forming a votes table for use in online voting, the votes table comprising:
- a survey ID field to hold unique identifiers for the survey;
- a voter ID field to hold unique identifiers for the user who cast votes;
- a time stamp field to hold times when corresponding users cast their respective votes;
- a question number field to hold numbers of the survey questions voted on by the users; and
- a selected option field to hold the answer options selected by the users for corresponding survey questions.

30. A method for operating an interactive online vote in which a Web site provides surveys inviting readers to cast votes using their computers, the method comprising:
- presenting a survey to the readers, the survey having one or more questions, each question having answer options from which the readers select to cast a vote;
- receiving votes for the survey from the readers; and
- correlating a time stamp to each vote received which indicates the time when the reader cast that particular vote.

* * * * *

UNITED STATES PATENT AND TRADEMARK OFFICE
CERTIFICATE OF CORRECTION

PATENT NO. : 6,175,833 B1
DATED : January 16, 2001
INVENTOR(S) : Brenden West et al.

It is certified that error appears in the above-identified patent and that said Letters Patent is hereby corrected as shown below:

Column 1,
Line 28, change "www.msnbe.com" to -- www.msnbc.com --.
Line 56, change "real-tine" to -- real-time --.

Column 11,
Line 10, add -- a -- before "survey".
Line 57, add -- a -- before "voter".

Column 12,
Lines 42 and 46, change "bold" to -- hold --.

Column 13,
Line 41, change "bold" to -- hold --.

Signed and Sealed this

First Day of April, 2003

JAMES E. ROGAN
*Director of the United States Patent and Trademark Office*